(12) United States Patent
Sacchi

(10) Patent No.: US 7,171,625 B1
(45) Date of Patent: Jan. 30, 2007

(54) DOUBLE-CLICKING A POINT-AND-CLICK USER INTERFACE APPARATUS TO ENABLE A NEW INTERACTION WITH CONTENT REPRESENTED BY AN ACTIVE VISUAL DISPLAY ELEMENT

(75) Inventor: Cristiano Sacchi, San Francisco, CA (US)

(73) Assignee: Actify, Inc., San Francisco, CA (US)

( * ) Notice: Subject to any disclaimer, the term of this patent is extended or adjusted under 35 U.S.C. 154(b) by 641 days.

(21) Appl. No.: 10/174,782

(22) Filed: Jun. 18, 2002

(51) Int. Cl.
  G06F 13/00 (2006.01)
  G06F 15/00 (2006.01)
(52) U.S. Cl. .................. 715/754; 715/754; 345/154

(58) Field of Classification Search ................ 715/854, 715/853, 765, 711, 754, 715, 738, 751, 744; 345/157, 160
See application file for complete search history.

(56) References Cited

U.S. PATENT DOCUMENTS

| | | | |
|---|---|---|---|
| 6,380,959 B1 * | 4/2002 | Wang et al. ................ | 715/853 |
| 6,643,641 B1 * | 11/2003 | Snyder ......................... | 707/4 |
| 6,853,391 B2 * | 2/2005 | Bates et al. ................ | 715/854 |

\* cited by examiner

*Primary Examiner*—Cao (Kevin) Nguyen
(74) *Attorney, Agent, or Firm*—David R. Graham

(57) ABSTRACT

The invention enables a new type of interaction with content represented by an active visual display element in response to double-clicking a point-and-click user interface apparatus when the active visual display element is selected.

44 Claims, 2 Drawing Sheets

DOUBLE-CLICKING A POINT-AND-CLICK USER INTERFACE APPARATUS TO ENABLE A NEW INTERACTION WITH CONTENT REPRESENTED BY AN ACTIVE VISUAL DISPLAY ELEMENT

BACKGROUND OF THE INVENTION

1. Field of the Invention

This invention relates to the use of user interface apparatus and, in particular, to the use of point-and-click user interface apparatus.

2. Related Art

A mouse is commonly used as a user interface device to effect interaction with a computer. A mouse is constructed with one or more movable sections that can be moved by a finger of a user of the mouse when the user grasps the mouse with the user's hand. The movable section(s) are often constructed so that a clicking noise is produced when a movable section is moved, so that movement of a movable section of a mouse is commonly referred to as a "click" or as "clicking" the mouse. Typically, a mouse includes a "left-click movable section" that is positioned on the left side of the mouse (as the user faces the mouse when the mouse is positioned in the intended orientation) and a "right-click movable section" that is positioned on the right side of the mouse. Movement of the left-click movable section is referred to as a "left-click" or as "left-clicking" the mouse. Movement of the right-click movable section is referred to as a "right-click" or as "right-clicking" the mouse. Two clicks in rapid succession of a movable section of a mouse is referred to as a "double-click" or as "double-clicking" the mouse. A mouse can be used to produce an input to a computer in accordance with the position on a visual display device of the computer of a cursor element controlled by the mouse, the manner of clicking the mouse, and a computer program (e.g., operating system, application program) to which the mouse input is being provided. For example, a single left-click can produce one type of input to a computer program, a single right-click can produce another type of input to the computer program, and a double left-click can produce still another type of input to the computer program. Further, those same types of clicking can produce different types of inputs to a different computer program.

A mouse is a particular example of a general class of computer user interface apparatus that is referred to herein as point-and-click computer user interface apparatus. Point-and-click computer user interface apparatus can enable a computer user to position a cursor element on a display screen of a visual display device of a computer to select an active visual display element and click a movable part of the apparatus to effect an interaction with the content represented by the active visual display element in accordance with the particular manner of clicking. Point-and-click computer user interface apparatus can also be implemented by, for example, a trackball (for positioning the cursor element) and associated pushbutton mechanism(s) (for clicking).

For many computer programs, user input to the computer program using a point-and-click computer user interface apparatus is effected using single-clicks. (For such computer programs, multiple clicks—including a double-click—are interpreted as a single-click.) A computer program for browsing the World Wide Web ("Web browser") is an example of a computer program for which user input using a point-and-click computer user interface is effected in this manner. For example, when using the Internet Explorer Web browser produced by Microsoft Corporation, a single left-click when a cursor element is positioned to enable selection of (i.e., "clicking on") a part of a Web page designated as a "link" results in display of a new Web page corresponding to the link in the same browser window in which the original Web page was displayed. A single left-click when a cursor element is positioned to enable selection of a part of a Web page designated as a "link," while depressing the <Shift> key on a keyboard, results in display of a new Web page corresponding to the link in a new browser window that is different from the browser window in which the original Web page was displayed. A single right-click can cause display of a menu including choices which can depend on the nature of the part of the Web page which is selected by the position of the cursor element. For example, if the part of the Web page is a link, the menu of choices can enable, for example, display of a new Web page corresponding to the link in the same or a new browser window; if the part of the Web page is an image, the menu of choices can enable, for example, printing, saving, or electronically mailing the image, or using the image as "wallpaper;" and if the part of the Web page is a display of a short video clip, the menu of choices can enable, for example, zooming the display of the video clip in or out, changing the quality of the display of the video clip, or replaying, rewinding or fast-forwarding the display of the video clip.

Some computer programs for displaying audio and/or video content ("media players") are also examples of a computer program for which user input using a point-and-click computer user interface is effected using single-clicks. A single left-click can be used to select content for display by the media player or to control basic operation (e.g., start, stop, pause, rewind, fast forward) of the media player. A single right-click can cause display of a menu including choices for interacting in a particular manner (e.g., zooming the visual display in or out, pausing or restarting the display, muting the audio display) with content being displayed by the media player. (A left-click is used to select a menu choice.) The content is represented by a single version of data that is the same for all interactions with the content that can be selected using the point-and-click computer user interface apparatus. The RealPlayer and RealOne video players produced by RealNetworks, Inc. are examples of a media player that operates in the above-described fashion.

Double-clicking a point-and-click computer user interface apparatus can also be used to effect user input to a computer program. For example, in an interactive operating system based on the WIMP paradigm (Window, Icon, Mouse, Pointer), such as the Windows operating system produced by Microsoft Corporation, execution of a computer program can be started by double-clicking a point-and-click computer user interface apparatus when a cursor element is positioned to enable selection of a display icon representing the computer program, or a file can be opened by double-clicking a point-and-click computer user interface apparatus when a cursor element is positioned to enable selection of a display icon or text representing the file. However, double-clicking has not been used to effect user input to a Web browser that uniquely corresponds to the double-click input.

Additionally, computer programs implemented to make use of the Object Linking and Embedding (OLE) capability in some versions of the Windows operating system can effect particular control in response to double-clicking a point-and-click computer user interface apparatus. When interacting with a file using a first computer program, double-clicking a point-and-click computer user interface apparatus when a cursor element is positioned to enable selection of an embedded part of that file produced by a second computer program causes execution of the second computer program and presentation of an interface associated with the second computer program so that subsequent interaction with that part of the file occurs using the second computer program. For example, double-clicking a point-and-click computer user interface apparatus when a cursor element is positioned to enable selection of an Excel spreadsheet embedded in a Word document (both Excel and Word are computer programs produced by Microsoft Corporation) causes the interface for the Excel computer program to be displayed and further interaction with the spreadsheet to occur using the Excel computer program. Both computer programs operate with respect to a single version of a file: for example, a change made to the file with one computer program (e.g., a change made to a spreadsheet in a text document using a spreadsheet computer program) is reflected during subsequent interaction with the file using the other computer program (e.g., text editing with a word processing program). A single display window is used to enable interaction with a file using each of the computer programs.

SUMMARY OF THE INVENTION

The invention enables a new type of interaction with content represented by an active visual display element in response to double-clicking a point-and-click user interface apparatus when the active visual display element is selected. The invention can be used to enable interaction with any type of content, such as, for example, a still image (e.g., a pictorial image), video, audio (e.g., music), text or a graphical display (e.g., a projection graph). The interactions can include any manner of making use of data representing the content, such as, for example, generating a display using the data, editing the data, analyzing the data, manipulating the data, selectively accessing the data, searching the data, and/or rearranging the data. The new type of interaction can be, for example, interaction with a new version of data representing the content (e.g., a version of data that represents the content or an aspect of the content with a different degree of detail), interaction in a new display window, interaction using a new computer program, and/or enablement of new functionality in the same computer program that enabled the original interaction. The invention can be implemented so that a cursor element that is positioned to select the active visual display element identifies the double-click capability of the invention. The invention can be implemented for use with a computer, television or other apparatus that makes use of a point-and-click user interface apparatus to enable user input.

In one embodiment, the invention ascertains a double-click input to a point-and-click user interface apparatus when an active visual display element is selected (the active visual display element representing content with which a user can interact), the interaction with the content prior to the double-click input occurring using a first version of data representing the content, then, in response to the double-click input to the point-and-click user interface apparatus, the invention enables interaction with the content using a second version of data representing the content. The second version of data can represent the content in a different way than does the first version of data (e.g., the second version of data can represent the content or an aspect of the content in more detail than does the first version of data). For example, if the content is a pictorial image, the second version of data can enable generation of one or more pictorial images in addition to any pictorial image that can be generated from the first version of data and/or the second version of data can enable generation of a pictorial image having higher resolution than that of any pictorial image that can be generated from the first version of data. Alternatively, the second version of data can be a copy of the first version of data. The second version of data can enable an interaction that is different from any interaction enabled by the first version of data. Interaction with the second version of data can be enabled using a new computer program that is different from the original computer program used to enable the interaction with the first version of data. Interaction with the second version of data can also be enabled using new functionality in the computer program used to enable the interaction with the first version of data. Interaction with the second version of data can occur in a new display window that is different from the original display window in which the interaction with the first version of data occurs.

In another embodiment, the invention ascertains a double-click input to a point-and-click user interface apparatus when an active visual display element that is part of a Web page displayed on a display screen of a visual display device is selected, then, in response to the double-click input to the point-and-click user interface apparatus, the invention enables an interaction that is different from any other interaction enabled by a single-click input to the point-and-click user interface apparatus. The new interaction can be enabled using a new computer program that is different from the original computer program used to enable the original interaction. The new interaction can also be enabled using new functionality in the computer program used to enable the original interaction. The new interaction can occur in a new display window that is different from the original display window in which the original interaction occurs. The new interaction can also be enabled using a new version of data that is different from the original version of data used to enable the original interaction.

DETAILED DESCRIPTION OF THE INVENTION

Figure 1:
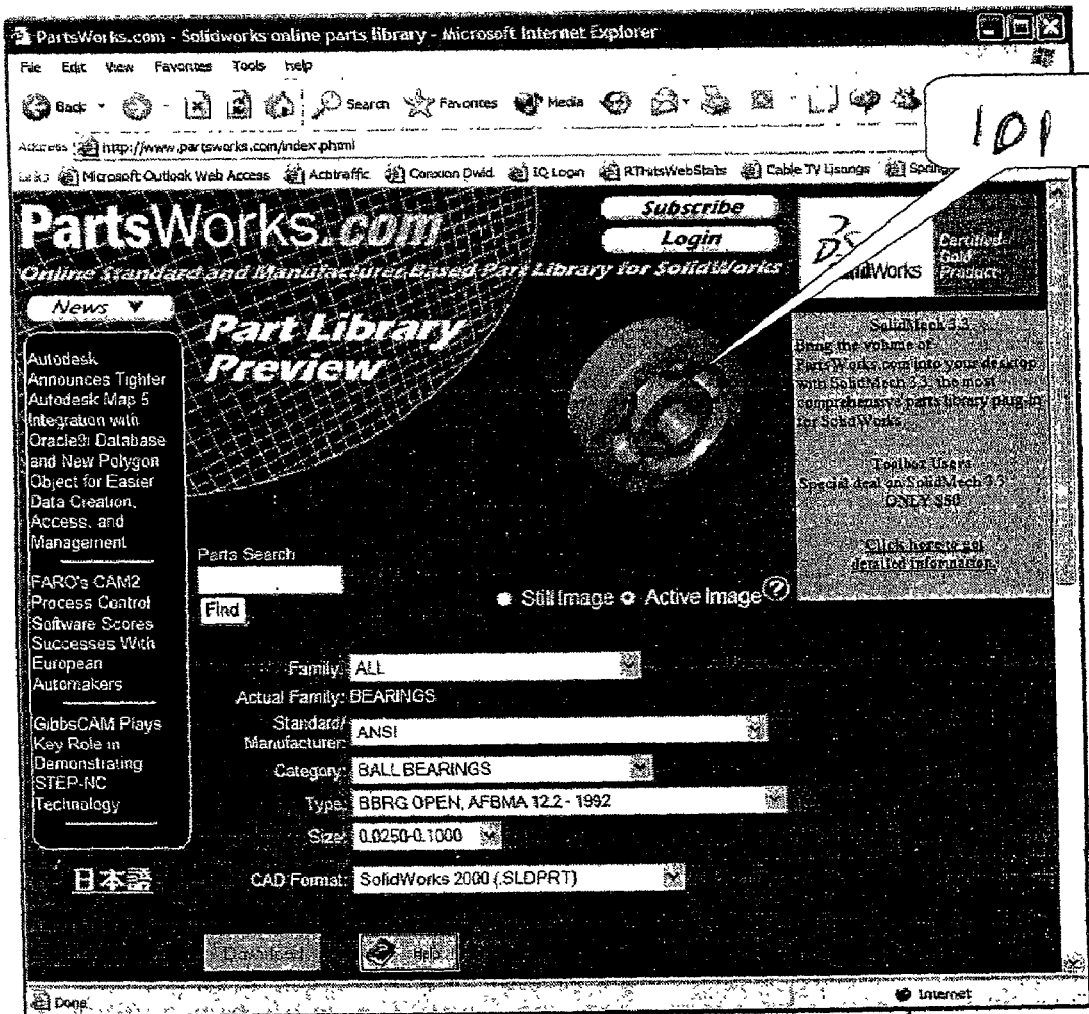
FIG. 1 illustrates the display by a Web browser of a Web page including a three-dimensional image of a ball bearing, the three-dimensional image being produced from a simplified version of design data representing the ball bearing.

According to the invention, double-clicking a point-and-click user interface apparatus produces or enables functionality not previously produced or enabled by such a user input. Once users have become acclimated to the use of a double-click input to produce or enable functionality in accordance with the invention, the invention can provide an intuitive and easy way to access such functionality. As used herein, "point-and-click user interface apparatus" includes apparatus that enables a user to position a cursor element (e.g., an arrow, cursor, pointing finger or similar GUI mechanism, all of which are subsumed within the term "cursor element," as used herein) on a display screen of a visual display device to select an active visual display element (i.e., any part of a visual display, such as, for example, a pictorial image, text, an icon or a graphical pushbutton, that can be used to effect an interaction with corresponding content) and "click" (i.e., move) a movable part of the apparatus to effect an interaction with the content represented by the active visual display element in accordance with the particular manner of clicking. As used herein, "point-and-click user interface apparatus" can also include apparatus that can be used in an analogous manner to select an active visual display element (e.g., a touchscreen, which can be touched once to effect an input analogous to a single-click input or twice in rapid succession to effect an input analogous to a double-click input). The invention enables a new type of interaction with content represented by an active visual display element in response to double-clicking a point-and-click user interface apparatus while an active visual display element is selected. The invention can advantageously be used to enable interactions (e.g., execution of a new computer program or transfer of control to a new computer program, use of a new version of data representing the content with which user interaction occurs) for which it is desirable that a user indicate the more definite intention to engage in the interaction that is provided by a double-click input as compared to a single-click input.

The invention can be used to enable interaction with any type of content. For example, the invention can be used to enable interaction with a still image (e.g., a pictorial image), video, audio (e.g., music), text or a graphical display (e.g., a projection graph). The content is represented by data that enables the interaction with the content and generation of the display of the active visual display element. Further, the content can be represented by different versions of data. The different versions of data can simply be two copies of the same data, each of which can be interacted with independent of the other (e.g., changes can be made to a second copy of the data—and, if desired, saved—without affecting the first copy of the data). However, the different versions of data can also be versions of data which represent the content in different ways (e.g., represent the content or an aspect of the content with different degrees of detail). As discussed in more detail below, the invention can advantageously be used to enable interaction with content that is represented by multiple versions of data (in particular, content which is represented by versions of data that represent the content or an aspect of the content with different degrees of detail.

Herein, "interaction with" content includes any manner of making use of data representing the content. For example, interacting with content can include generating a display using data representing the content, editing data representing the content, analyzing data representing the content, manipulating data representing the content, selectively accessing data representing the content, searching data representing the content, and/or rearranging data representing the content.

As indicated above, the invention enables a new type of interaction with content in response to double-clicking a point-and-click user interface apparatus. The invention can enable a variety of types of new interaction with content in response to double-clicking a point-and-click user interface apparatus. For example, the new type of interaction can be interaction with a version of data representing the content that is different from (e.g., represents the content or an aspect of the content with a different degree of detail) the version of data representing the content with which interaction occurs just prior to a double-click input in accordance with the invention. The new type of interaction can also be interaction in a display window that is different from the display window in which interaction occurred just prior to a double-click input in accordance with the invention. The new type of interaction can also be interaction using a computer program that is different from the computer program with which interaction occurred just prior to a double-click input in accordance with the invention. (The double-click input can cause the "new" computer program to begin executing or, when the new computer program is already executing, to transfer control to that computer program.) The new type of interaction can also be the enablement of new functionality in the same computer program that enabled interaction just prior to a double-click input in accordance with the invention. Further, the new type of interaction can be a combination of any two or more of the above-described types of new interaction that can be enabled by a double-click input in accordance with the invention.

For example, in one embodiment, the invention is implemented so that a double-click input to a point-and-click user interface apparatus enables interaction with a version of data representing content that is different from a version of data representing that content that is used for interaction prior to the double-click input (e.g., the "new" version of data represents the content or an aspect of the content in more detail than does the "original" version of data). This implementation of the invention can, for example, advantageously provide a simple and immediate way to access and/or edit detailed information regarding content from an initial simplified presentation of that content. As discussed further below, this implementation of the invention can be advantageously used in presenting content in a Web page.

In another embodiment, for example, the invention is implemented so that a double-click input to a point-and-click user interface apparatus enables an interaction with content represented by an active visual display element that is part of a Web page that is different from any other interaction with that content enabled by a single-click input to the point-and-click user interface apparatus. This implementation of the invention can make use of double-clicking to provide a new universe of Web page interactions that have not previously been possible. This implementation of the invention can also make use of double-clicking to enable Web page interactions in a new way.

The invention can be used with any point-and-click user interface apparatus. A mouse is a common example of a point-and-click user interface apparatus with which the invention can be used. The invention can also be used with a trackball (or other apparatus for positioning a cursor element, such as the toggling mechanism positioned within the confines of the keyboard on some notebook computers) and associated activation mechanism(s) (e.g., pushbutton(s)). The invention can also be used with a touchscreen.

Further, the invention can be used with any apparatus adapted to enable user interaction with the apparatus using a point-and-click user interface apparatus. It is anticipated that, in particular, the invention will be used with a computer with which a point-and-click user interface apparatus is associated and that the invention will be implemented using the computer. The invention can be implemented for use with computers such as, for example, desktop computers or portable computers (e.g., notebook computers, subnotebook computers, personal digital assistants). However, the invention can be used with other devices with which a point-and-click user interface apparatus is associated, such as a television. The invention can be implemented, for example, in a television set top box or as part of a television. The invention can also be implemented in a cell phone constructed to include point-and-click user interface apparatus (e.g., a small trackball and pushbutton).

The invention can be implemented, for example, by one or more computer programs (e.g., a Web page plug-in or Visual Basic computer program(s)) including instructions for accomplishing the functions of the invention. For example, such computer program(s) can include instruction(s) for ascertaining a double-click input to a point-and-click user interface apparatus when an active visual display element representing content with which a user can interact is selected (e.g., when a cursor element controlled by the point-and-click user interface apparatus is positioned on a display screen of a visual display device to select the active visual display element). Such computer program(s) can also include instruction(s) for enabling the new interaction with the content in response to the double-click input. Those skilled in the art can readily implement the invention as one or more computer program(s) in view of the description herein.

The invention can make use of conventional mechanisms to identify that an active visual display element has been "selected" and to identify a double-click input. For example, the invention can make use of conventional computer operating system mechanism(s) and application programmer interface (API) mechanism(s) (e.g., Win32 in a Windows operating system) for this purpose. An active visual display element can be deemed selected, for example, when a part of a cursor element is positioned within a boundary defined with respect to the active visual display element (e.g., the boundary of the active visual display element or a boundary including the active visual display element and a specified area proximate to the active visual display element).

An active visual display element can be selected by using a point-and-click user interface apparatus to appropriately position a cursor element. The invention can make use of a conventional cursor element representation. However, the invention can also be implemented to produce a cursor element of a type (e.g., defining a particular shape and/or having a particular color) that is particularly associated with the double-click functionality of the invention, thereby indicating to a user that the double-click functionality of the invention is available for use by the user. Such a "special purpose cursor" can be implemented using conventional API mechanism(s).

A computer program sometimes presents content represented by rich or complex data using a version of the data that is in a simplified form. For example, a computer program may aggregate content represented by data coming from different sources and/or data of different types for presentation together in a single display. Or, for example, a computer program may simplify image data representing a visual image to enable production of a display of the visual image in a relatively small area. As discussed in more detail below, a Web browser is an example of a computer program that simplifies data for presentation. The Acrobat family of document presentation computer programs made by Adobe Systems, Inc. are other examples of computer programs that simplify data for presentation. It can be very useful to investigate the unsimplified data further (e.g., launch a computer program that gathers the original rich or complex form of the data and then offers powerful features for interaction with the content using the data in that form), however no means is provided for doing so. When content has been initially presented using data in a simplified form (e.g. displayed in a Web page or by an Acrobat document presentation computer program), the invention can advantageously be used to enable further interaction with the content using a rich or complex version of data representing the content. According to the invention, a double-click input provided to a point-and-click user interface apparatus enables interaction with content using a version of data that is richer or more complex (i.e., that represents the content or an aspect of the content in more detail) than a simplified version of data used for an initial presentation of the content.

For example, as discussed above, a computer program sometimes converts image data representing a visual image into lower resolution image data representing that image to enable production of a display of the visual image in a relatively small area (this is commonly done to display a visual image in a Web page). In accordance with the invention, a double-click input to a point-and-click user interface apparatus when the point-and-click user interface apparatus is used to "select" the low resolution version of the image can cause the original higher resolution image data to be retrieved and used to generate a higher resolution image display. In particular, the double-click input can cause a specified image processing computer program to begin executing (or transfer control to such computer program if already executing) to effect the higher resolution image display. The image processing computer program can also enable, additionally or alternatively, other image displays and/or interactions that are not possible using the low resolution image data and/or the computer program that generated the low resolution image display. The image processing computer program launched by the double-click input can enable, for example, zooming of the image, image enhancement (e.g., edge extraction, blurring, feature recognition), rotation of the image, printing of the image and/or saving of the image data in another format. The double-click input can enable a user to delve into the image data with specific software that can treat the image data in its richest form.

A Web page is a good example of an environment in which the invention can be used in the above-described manner. A Web page is a useful vehicle for the display of content represented by data coming from different sources and/or data of different types. However, because a Web page is meant to present content represented by data coming from different sources and/or data of different types together in a single display, often, in order to effect such display the data is simplified for use in presenting the content in the Web page. Data representing a pictorial image is a typical example of data that is often originally in a rich form (data for generating a high resolution visual image) that is simplified (transformed into a low resolution bitmap) in order to fit the layout of a Web page. (Herein, a "pictorial image" is a visual image of part or all of an animate object, such as a person or animal, part or all of an inanimate object, or a scene including such objects; as used herein, text is not a pictorial image. Pictorial images can include both two-dimensional and three-dimensional images.) Though data representing text is not simplified, typically almost all of the other data used to present content in a Web page is in a simplified form. For example, graphical displays of historical data (e.g., financial data such as past stock prices, weather data such as temperatures and/or precipitation levels for a geographic region) typically present only a subset of the data (e.g., present a display of the data at a coarser level of detail and/or over a smaller range than that possible using the entire set of data). The invention can be implemented to provide an easy way to enable the exploration of such data in its rich form, without detrimentally affecting the presentation of content in the Web page. The Web page can be viewed as a first level presentation of the content; the invention enables a user to dig deeper into the content presented in the Web page using data-specific tool(s), breaking down the data representing the content to its original unsimplified form to enable deeper understanding of the content.

For example, a pictorial image displayed as part of a Web page can be implemented using a plug-in (or other set of computer instructions providing the functionality described herein) that also implements the invention. The invention can be implemented (i.e., the plug-in can include appropriate instructions) so that provision of a double-click input to a point-and-click user interface apparatus when the point-and-click user interface apparatus is used to "select" the pictorial image begins execution of a new computer program (or transfers control to such computer program if already executing) that enables interaction with data of the type used to generate the pictorial image. In particular, the invention can be implemented so that the new computer program makes use of a version of data representing the pictorial image that represents more information regarding the pictorial image (i.e., represents the content or an aspect of the content in more detail) than the simplified version of data used to produce the pictorial image in the Web page. For example, the invention can be implemented so that a double-click input begins execution of a computer program that enables image processing (examples of which are discussed above) to be performed on the pictorial image, either automatically or in response to instruction from a user, the image processing operating on a more detailed version of data than that used to produce the pictorial image in the Web page.

If, instead of a pictorial image, a video is displayed as part of the Web page (e.g., a streaming video produced from a relatively low resolution version of the video data), the invention can be implemented so that a double-click input to a point-and-click user interface apparatus when the point-and-click user interface apparatus is used to "select" the video display begins execution of a new computer program (or transfers control to such computer program if already executing) that enables editing of the video to be performed using a higher resolution version of the video data which is made accessible all at once to the new computer program. For display in a Web page, use of the low resolution video data can be acceptable (e.g., because the area of the video display is relatively small). Streaming the video data can therefore produce an acceptable video display, since the relatively small amount of low resolution video data can be transferred without encountering unacceptable bandwidth limitations. For editing of the video, however, it can be desirable to have access to a high resolution version of the video data to facilitate high quality video editing. Additionally, streaming the video is undesirable, since video editing may require use of data that has not yet been transferred. The invention enables the use of a double-click input to a point-and-click user interface apparatus to immediately enable video editing in an environment appropriate for that activity (e.g., using an appropriate computer program, using high resolution video data, having access to all of the video data at once).

Figure 2:
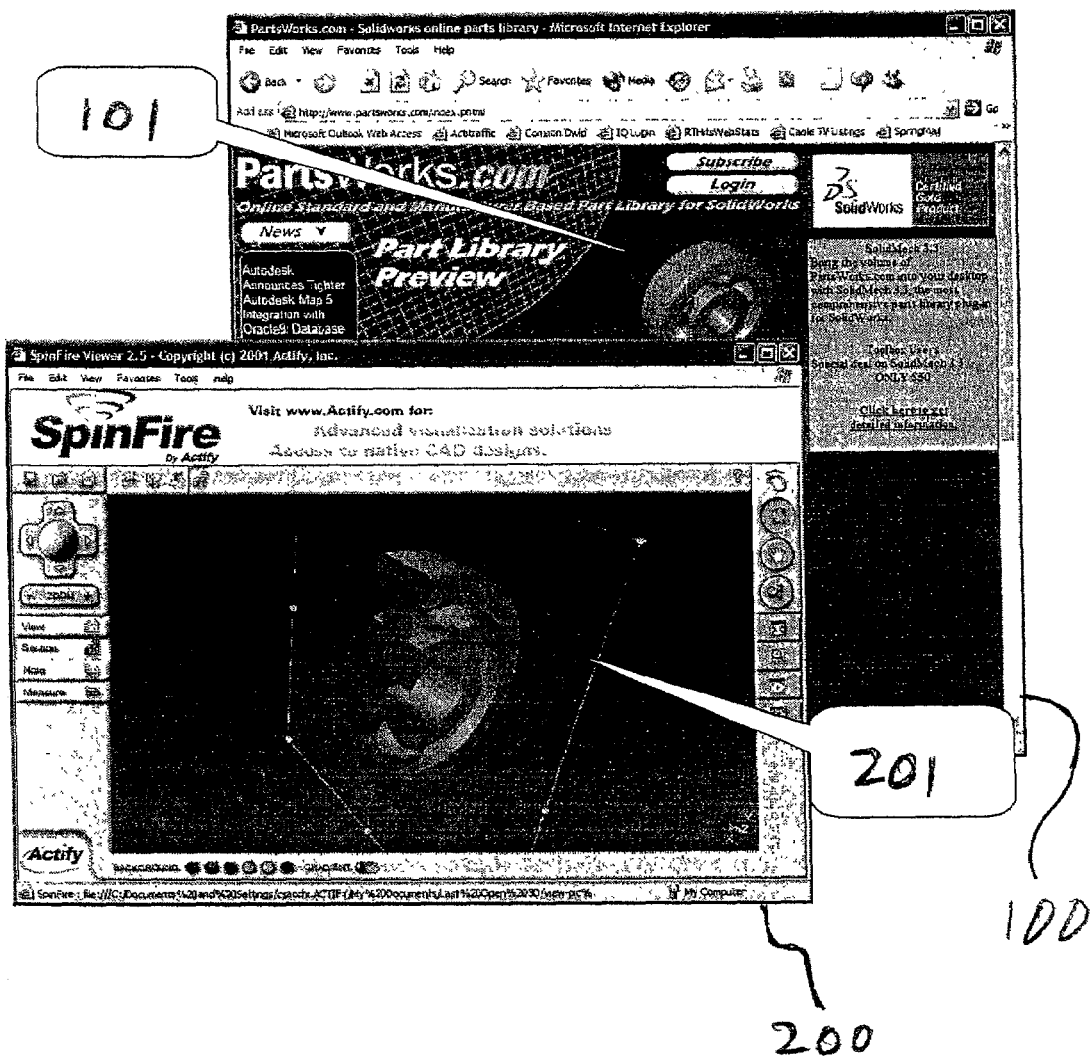
FIG. 2 illustrates the display by a visualization computer program of a cross-sectional image of the three-dimensional image of a ball bearing displayed in the Web page illustrated in FIG. 1, the cross-sectional image being produced from an unsimplified version of design data representing the ball bearing.

As one example of the above-described implementation of the invention in which a pictorial image is displayed as part of a Web page, a Web page can be implemented to include a plug-in (or other set of computer instructions providing the functionality of the invention) that makes use of a simplified version of design data obtained from computer-aided design (CAD) system(s) to generate pictorial image display(s) from image data included in the design data (the design data can also include data in addition to the image data, such as, for example, data describing design histor(ies), data describing manufacturing parameters and/or instructions, data describing bill(s) of materials, data describing product structure(s) and/or assembly tree(s), data describing materials composition(s)), and that executes a visualization computer program (e.g., the Spinfire software produced by Actify, Inc. of San Francisco, Calif.), in response to a double-click input to a point-and-click user interface apparatus when the pictorial image display(s) generated from the simplified design data are selected, that makes use of a more complex version of the design data (e.g., unsimplified design data obtained from CAD system(s)) to enable advanced analysis of, and/or generation of pictorial image display(s) from, the design data. FIG. 1 illustrates the display by a Web browser of a Web page including a three-dimensional image 101 of a ball bearing generated from design data. A Web page is an excellent way to present such a pictorial image, along with other information produced from the design data (such as, for example, the identity of the designer, the identity of a supplier, recent price history, operational characteristics, the identity of related apparatus), but often the pictorial image must be presented in a small area of the Web page (note the size of the ball bearing in FIG. 1 relative to the size of the entire Web page), which can necessitate use of a simplified version of the design data (e.g., low resolution image data for generating a pictorial image). While pictorial images generated from the simplified design data are adequate to enable browsing of the content represented by the design data (e.g., to enable browsing of a Web-based catalog of machine parts), such pictorial images may not present the content represented by the design data as accurately or fully as desired and/or do not enable advanced analysis of the design data, which may be desired in some circumstances. The invention enables such advanced display and/or analysis to be readily accomplished by executing a visualization computer program that makes use of the unsimplified design data in response to a double-click input to a point-and-click user interface apparatus. FIG. 2 illustrates the display by a visualization computer program (in a window 200 that is different from a window 100 in which the Web page is displayed) of a cross-sectional image 201 of the three-dimensional image 101 of a ball bearing displayed in the Web page illustrated in FIG. 1. Depending on the complexity of the unsimplified design data (i.e., the amount of detail represented by the unsimplified design data) and on the particular implementation of the visualization computer program, the visualization computer program can enable other types of interaction with the design data, such as, for example, zooming the pictorial image display in and out, rotating the pictorial image display, panning the pictorial image display, producing isometric views, and making measurements of the displayed object.

To enable embodiments of the invention, as described above, in which a double-click input provided to a point-and-click user interface apparatus enables interaction with content using a new version of data that is different (e.g., that represents the content or an aspect of the content in more detail) from an original version of data used for an initial presentation of the content, the new version of data must be available to be retrieved and used in accordance with the invention. It is anticipated that, typically, the "new" version of data will already exist, the "original" version of data having been produced from the new version of data by, for example, culling a subset of data from the new version of data, combining the data in the new version of data to create the original version of data, or creating a copy of the new version of data. ("New" version of data and "original" version of data as used herein refer to the relative times at which the versions of data are used for interaction with the content, not to the relative times at which those versions of data are created.) Retrieval of the new version of data can occur in any of a variety of ways: the particular manner can depend on the environment in which the invention is used. In general, the new version of data can be stored at any location and in any manner (e.g., in any type of data storage device, using any type of data storage format), and the original version of data has associated therewith data that indicates the location of the new version of data. For example, the new version of data can be stored at a remote location on a network that is different from a location on the network at which the interaction occurs (in particular, this can be the case when the invention is implemented to enable interaction with a new version of data representing content initially presented in a Web page), the new version of data being retrieved from the remote location (e.g., streamed from the remote location) in response to the double-click input. The new version of data can also be stored at the location at which the interaction occurs (e.g., in the same data storage device as the original version of data).

The above description of the invention also illustrates another aspect of the invention. In an above-described implementation of the invention, a double-click input causes execution of a computer program that enables interaction with content using a version of data that is more complex than that used for an initial interaction with the content (i.e., production of a pictorial image display) in a Web page. However, the invention can be used to enable other types of interaction with content presented initially in a Web page. In accordance with the invention, a double-click input to a point-and-click user interface apparatus when an active visual display element that is part of a Web page is selected can enable any interaction that is different from any other interaction enabled by a single-click input to the point-and-click user interface apparatus at such time. For example, the double-click input may (by, for example, beginning execution of a computer program) enable interaction with a copy of the version of data that is used to enable interaction just prior to the double-click input. Further, such interaction may enable revisions to be made to the copy of the data and may enable the revised data to be saved. The double-click input may also cause execution of a new computer program (or transfer control to such computer program if already executing), or may enable new functionality in the same computer program that enabled interaction just prior to the double-click input, to enable a new type of interaction with the same version of data used to enable interaction just prior to the double-click input.

Above, the invention is sometimes described as implemented to enable interaction with image data used to generate a pictorial image. In particular, the invention is described as particularly implemented to enable interaction with design data provided by a CAD system. However, generally, the invention can be applied to enable interaction with any type of data, including, for example, data representing any type of pictorial image, video clip, music, graphical display (e.g., a historical graph of a stock price) and/or text (e.g., stock quotes). In particular, it is anticipated that the invention can advantageously be implemented to enable further exploration of data initially presented in a Web page. Further, the invention can be implemented to enable any type of interaction that is appropriate for a particular type of data. For example, the invention can be implemented so that a double-click input to a video display can cause a video that is initially displayed at a low resolution (as may be the case, for example, with a video displayed on a small part of a Web page) to be displayed at a higher resolution (e.g., displayed as a "full screen" video that fills an entire display screen). Or, for example, a double-click input to a music display (e.g., music displayed using a media player such as the RealJukebox audio player produced by RealNetworks, Inc.) can enable the use of new functionality with the music display, such as, for example, equalization. Or, for example, a double-click input to a projection graph can enable new functionality for interacting with the projection graph, such as the display of different bars or high-resolution printing. (The immediately previous two examples are illustrations of embodiments of the invention that can be implemented so that the new interaction enabled by the double-click input in accordance with the invention is the enablement of new functionality in the computer program used for the original interaction.) Or, for example, a double-click input to a graphical display of historical data (e.g., a graph of average seasonal temperature in a geographic region) can begin execution of a computer program that enables analysis of, and/or production of a new graphical display from, the full set of data (e.g., daily or hourly temperatures in the geographic region) from which the data (e.g., average temperature in the geographic region for each season of multiple years) was obtained for use in producing the original graphical display. In general, there can be as many examples of use of a double-click input to enable new interaction with content as there are data types displayed by content presentation tools.

Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. A method, comprising the steps of:
   ascertaining a double-click input to a point-and-click user interface apparatus when an active visual display element is selected, the active visual display element representing content with which a user can interact, wherein interaction with the content prior to the double-click input occurs using a first version of data representing the content; and
   in response to the double-click input to the point-and-click user interface apparatus, enabling interaction with the content using a second version of data representing the content.

2. A method as in claim 1, wherein the second version of data represents the content in a different way than does the first version of data.

3. A method as in claim 2, wherein the second version of data represents the content or an aspect of the content in more detail than does the first version of data.

4. A method as in claim 1, wherein the second version of data is a copy of the first version of data.

5. A method as in claim 1, wherein the second version of data enables an interaction that is different from any interaction enabled by the first version of data.

6. A method as in claim 1, wherein:
   a first computer program enables the interaction with the content using the first version of data representing the content; and
   the step of enabling further comprises the step of executing a second computer program that enables the interaction with the content using the second version of data representing the content, the second computer program being different from the first computer program.

7. A method as in claim 1, wherein:
a computer program enables the interaction with the content using the first version of data representing the content; and
the step of enabling further comprises the step of enabling new functionality in the computer program that enables the interaction with the content using the first version of data.

8. A method as in claim 1, wherein the interaction with the second version of data is in a second display window that is different from a first display window in which the interaction with the first version of data occurs.

9. A method as in claim 1, wherein the content comprises a pictorial image.

10. A method as in claim 9, wherein the second version of data enables generation of one or more pictorial images in addition to any pictorial image that can be generated from the first version of data.

11. A method as in claim 9, wherein the second version of data enables generation of a pictorial image having higher resolution than that of any pictorial image that can be generated from the first version of data.

12. A method as in claim 1, wherein the active visual display element is part of a Web page displayed on a visual display device.

13. A method as in claim 1, wherein the data representing the content is design data obtained from one or more computer-aided design systems.

14. A method as in claim 1, further comprising the step of displaying a cursor element that identifies the capability of performing the step of enabling in response to a double-click input to the point-and-click user interface apparatus, wherein the point-and-click user interface apparatus can be used to position the cursor element on a display screen of a visual display device to select the active visual display element.

15. A method as in claim 1, wherein the content comprises video content.

16. A method as in claim 1, wherein the content comprises audio content.

17. A method as in claim 1, wherein the point-and-click user interface apparatus comprises:
means for positioning a cursor element on a display screen of a visual display device to select the active visual display element; and
means for effecting the double-click input.

18. A method as in claim 17, wherein the means for positioning a cursor element and the means for effecting the double-click input comprise a mouse.

19. A method as in claim 17, wherein the means for positioning a cursor element comprises a trackball.

20. A method as in claim 19, wherein the means effecting the double-click input comprises a pushbutton.

21. A method as in claim 1, wherein the point-and-click user interface apparatus comprises a touchscreen.

22. A method as in claim 1, implemented for use with a computer.

23. A method as in claim 1, implemented for use with a television.

24. A method, comprising the steps of:
ascertaining a double-click input to a point-and-click user interface apparatus when an active visual display element that is part of a Web page displayed on a display screen of a visual display device is selected, the active visual display element representing content with which a user can interact; and
in response to the double-click input to the point-and-click user interface apparatus, enabling an interaction with the content that is different from any other interaction enabled by a single-click input to the point-and-click user interface apparatus when the active visual display element is selected.

25. A method as in claim 24, wherein:
a first computer program enables the interaction with the content using the first version of data representing the content; and
the step of enabling further comprises the step of executing a second computer program that enables the interaction with the content using the second version of data representing the content, the second computer program being different from the first computer program.

26. A method as in claim 24, wherein:
a computer program enables the interaction with the content using the first version of data representing the content; and
the step of enabling further comprises the step of enabling new functionality in the computer program that enables the interaction with the content using the first version of data.

27. A method as in claim 24, wherein the interaction with the second version of data is in a second display window that is different from a first display window in which the interaction with the first version of data occurs.

28. A method as in claim 24, wherein:
interaction with the content prior to the double-click input occurs using a first version of data representing the content; and
interaction with the content after the double-click input occurs using a second version of data representing the content that is different from the first version of data.

29. A method as in claim 24, wherein the content comprises a pictorial image.

30. A method as in claim 24, wherein the data representing the content is design data obtained from one or more computer-aided design systems.

31. A method as in claim 24, further comprising the step of displaying a cursor element that identifies the capability of performing the step of enabling in response to a double-click input to the point-and-click user interface apparatus, wherein the point-and-click user interface apparatus can be used to position the cursor element on the display screen to select the active visual display element.

32. A method as in claim 24, wherein the content comprises video content.

33. A method as in claim 24, wherein the content comprises audio content.

34. A method as in claim 24, wherein the point-and-click user interface apparatus comprises:
means for positioning a cursor element on the display screen to select the active visual display element; and
means for effecting the double-click input.

35. A method as in claim 34, wherein the means for positioning a cursor element and the means for effecting the double-click input comprise a mouse.

36. A method as in claim 34, wherein the means for positioning a cursor element comprises a trackball.

37. A method as in claim 36, wherein the means effecting the double-click input comprises a pushbutton.

38. A method as in claim 24, wherein the point-and-click user interface apparatus comprises a touchscreen.

39. A method as in claim 24, implemented for use with a computer.

40. A method as in claim 24, implemented for use with a television.

41. A system, comprising:
   means for ascertaining a double-click input to a point-and-click user interface apparatus when an active visual display element is selected, the active visual display element representing content with which a user can interact, wherein interaction with the content prior to the double-click input occurs using a first version of data representing the content; and
   means for enabling, in response to the double-click input to the point-and-click user interface apparatus, interaction with the content using a second version of data representing the content.

42. A system, comprising:
   means for ascertaining a double-click input to a point-and-click user interface apparatus when an active visual display element that is part of a Web page displayed on a display screen of a visual display device is selected, the active visual display element representing content with which a user can interact; and
   means for enabling, in response to the double-click input to the point-and-click user interface apparatus, an interaction with the content that is different from any other interaction enabled by a single-click input to the point-and-click user interface apparatus when the active visual display element is selected.

43. A computer readable medium or media encoded with one or more computer programs, comprising:
   instructions for ascertaining a double-click input to a point-and-click user interface apparatus when an active visual display element is selected, the active visual display element representing content with which a user can interact, wherein interaction with the content prior to the double-click input occurs using a first version of data representing the content; and
   instructions for enabling, in response to the double-click input to the point-and-click user interface apparatus, interaction with the content using a second version of data representing the content.

44. A computer readable medium or media encoded with one or more computer programs, comprising:
   instructions for ascertaining a double-click input to a point-and-click user interface apparatus when an active visual display element that is part of a Web page displayed on a display screen of a visual display device is selected, the active visual display element representing content with which a user can interact; and
   instructions for enabling, in response to the double-click input to the point-and-click user interface apparatus, an interaction with the content that is different from any other interaction enabled by a single-click input to the point-and-click user interface apparatus when the active visual display element is selected.

* * * * *